Figure 1:
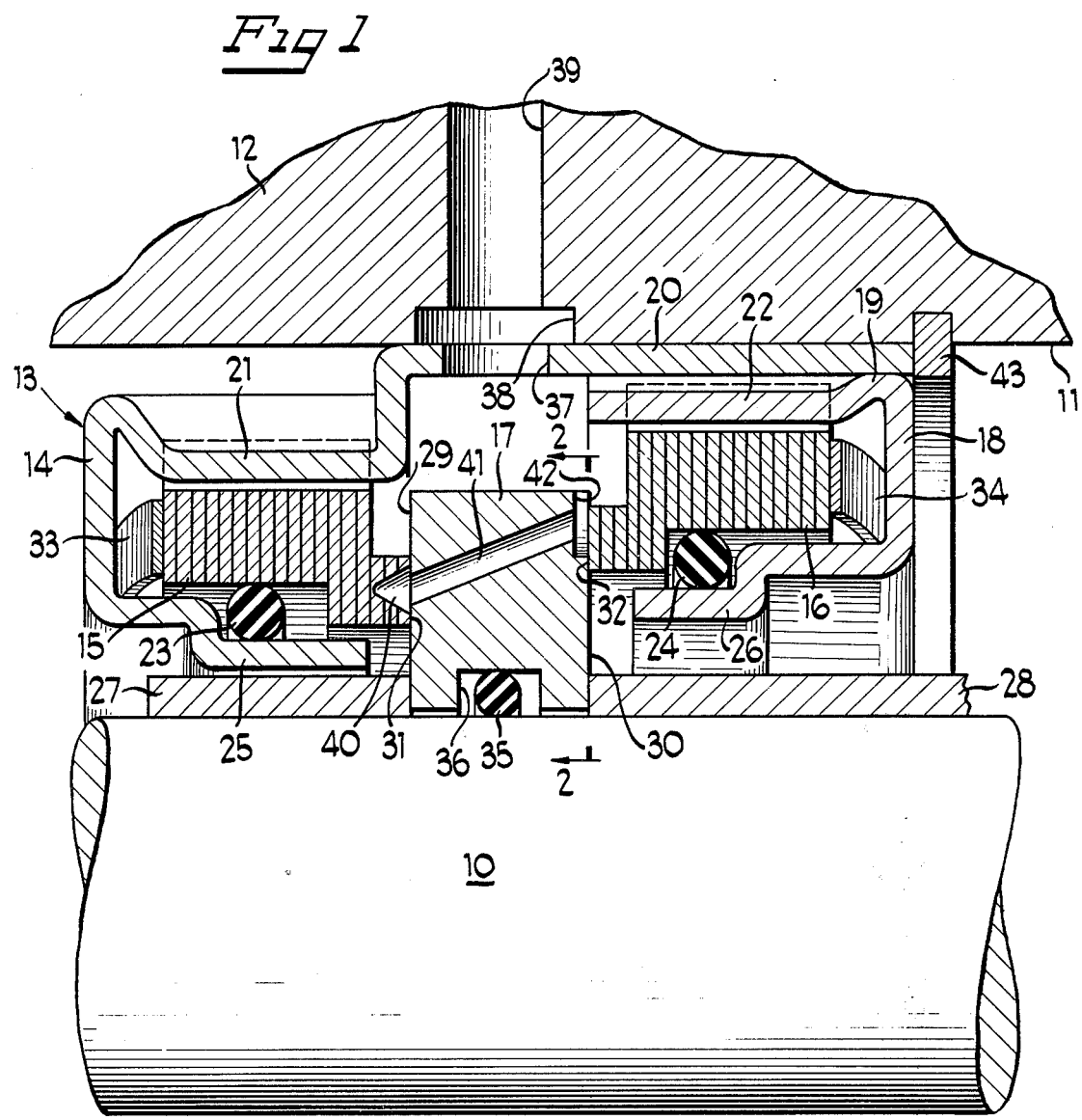

United States Patent [19]

Lukes

[11] 3,941,394

[45] Mar. 2, 1976

[54] NO-LEAK DOUBLE ROTARY MECHANICAL SEAL

[75] Inventor: Donald J. Lukes, Palatine, Ill.

[73] Assignee: Crane Packing Company, Morton Grove, Ill.

[22] Filed: Dec. 9, 1974

[21] Appl. No.: 531,082

[52] U.S. Cl. .................. 277/40; 277/61; 277/96
[51] Int. Cl.² .................. F16J 9/00; F16J 15/40
[58] Field of Search .................. 277/61, 40, 96 A

[56] References Cited
UNITED STATES PATENTS

| | | | |
|---|---|---|---|
| 2,662,480 | 12/1953 | Cliborn | 277/61 X |
| 2,712,459 | 7/1955 | Wahl | 277/40 |
| 3,100,647 | 8/1963 | Lee et al. | 277/96 A X |
| 3,410,565 | 11/1968 | Williams | 277/3 |

FOREIGN PATENTS OR APPLICATIONS

| | | | |
|---|---|---|---|
| 692,374 | 6/1953 | United Kingdom | 277/96 A |

*Primary Examiner*—Samuel B. Rothberg

[57] ABSTRACT

A substantially no-leak rotary end face seal is disclosed. The seal is comprised of a pair of spaced primary sealing rings between which a rotating mating ring is disposed. A groove in the inboard primary ring face collects leakage from the high pressure side of the inboard seal. A series of radially outwardly inclined holes in the rotating mating ring connect at one end with the groove and at the other end with a radially disposed hydropad in the mating ring face. The outboard primary ring face extends radially inward of the hydropads to provide a continuous sealing surface which is at sub-atmospheric pressure during operation to prevent leakage to the atmosphere. The inclination of the holes produces a pumping action in the leakage in the holes, which is assisted by the hydropads, the pumping action causing the leakage to circulate through a collecting chamber and then back to the sump of the sealed equipment. The hydropads provide the additional function of separating the radially inner sealing faces of the outboard seal which normally would run dry and hence would tend to wear rapidly if in running contact.

4 Claims, 2 Drawing Figures

U.S. Patent    March 2, 1976    3,941,394

NO-LEAK DOUBLE ROTARY MECHANICAL SEAL

This invention relates to rotary end face seals which employ two primary sealing rings sealing against a common rotating mating ring and which provide for fluid flow across the faces of the mating ring, contacted by the primary sealing rings.

In the end-face sealing art, it has been proposed to use the rotating part of the seal as a centrifugal pump to promote flow of fluid, usually the product being sealed, either across the contacting, relatively rotating faces of the seal for lubrication purposes, or away from the contacting faces for cleansing or cooling purposes. Such seals are shown in U.S. Pat. Nos. 2,835,514; 2,861,895; 3,062,554 and 3,410,565. For efficient sealing, however, it is desirable to lubricate the seal, if possible, to reduce leakage to zero. The former can be accomplished by providing indentations or hydraulic pads on one of the contacting faces to cause fluid to be wiped across the other of the contacting faces. The latter is best accomplished by a double seal which provides a chamber at less pressure than that of the product being sealed.

It is an object of this invention to provide a lubricated no-leak seal which utilizes the rotation of one of the seal parts to promote flow of lubricating fluid across the contacting faces of the seal, a pressure drop being established across the faces in a direction away from the atmosphere or outside of the seal.

A more specific object of this invention is to provide a double seal of simple construction which will cause a flow of lubricating fluid across both pairs of contacting faces and at the same time inhibit leakage to atmosphere of the product sealed.

Figure 2:
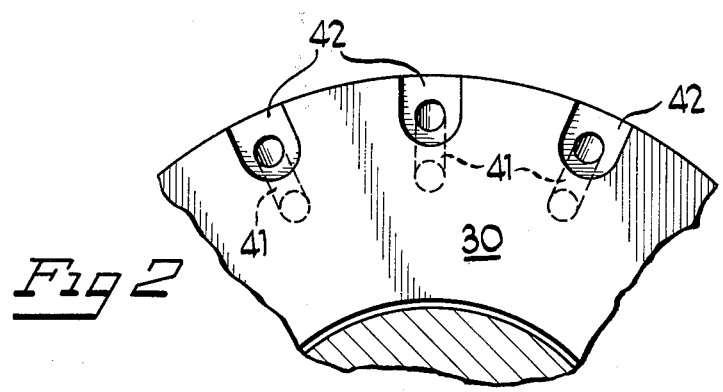

These and other objects of this invention will become apparent from the following detailed description thereof when taken together with the accompanying drawings in which:

FIG. 1 is a quarter section taken along a plane passing through the axis of a preferred embodiment of the seal; and FIG. 2 is a fragmentary end elevation of the rotating seat of the seal looking in the direction of the arrows 2—2 of FIG. 1.

In the preferred form of the invention illustrated herein, the seal is comprised of a mating ring secured and sealed to a shaft to be rotatable therewith, the mating ring having parallel flat lapped sealing surfaces on opposite sides thereof. An inboard primary sealing ring is mounted with its flat lapped sealing surface in contact with the inboard sealing surface of the mating ring. The inboard primary sealing ring is mounted on and sealed to a part fixed to the housing of the device to be sealed. An outboard primary sealing ring is mounted with its flat lapped sealing surface in contact with the outboard sealing surface on the mating ring. The outboard primary sealing ring is likewise mounted and sealed to a part fixed to the housing of the device to be sealed. Said part fixed to the housing may be a stamping which defines a chamber surrounding the mating ring and the two primary sealing rings in which leakage is accumulated and from which such leakage is pumped back into the device being sealed.

The inboard primary sealing ring has a groove in its sealing face into which the escaping product to be sealed may flow. The volume of escaping product can be controlled by changing the diameter of the groove and the width of the inside sealing surface. The rotating mating ring has a series of circumferentially spaced holes each of which has an entrance end in communication with the fluid in the groove. Said holes extend axially across the rotating mating ring, at an angle to its axis of rotation, to its opposite sealing surface where their outlet ends are at a greater radius from the axis of the seal than their entrance ends so that a radial outward centrifugal force will be exerted upon the fluid to be moved through the holes to the outboard sealing washer. Hydropads are formed in the contacting face of the mating ring around the outlet ends of the holes, the hydropads extending to the outer perimeter of the said face to communicate with a chamber formed around the seal. A drain empties the chamber into the sump of the sealed device.

Referring now to the drawings for a detailed description of the preferred embodiments of the invention, an annular seal cavity in the device to be sealed is defined by a shaft 10 and a bore 11 in a housing 12 in which shaft 10 rotates.

The seal itself is preferably a self-contained unit 13 which is comprised of a cylindrical retainer 14, an inboard primary sealing ring 15, an outboard primary sealing ring 16 and a central rotating mating ring 17 located between primary sealing rings 14 and 15. Outboard primary sealing ring 16 is mounted in a separate retainer 18 of an annular shape and having an outer wall 19 pressed into the outer cylindrical wall 20 of retainer 14 which, in turn, is press-fitted into bore 11 of housing 12. It is intended that the fit between wall 20 and bore 11, and between walls 19 and 20 will be fluid-tight.

Primary sealing rings 15 and 16 are held against rotation relative to retainer 14 by well-known lugs 21 and 22 in retainers 14 and 18, respectively, extending radially inward into corresponding notches in the outer periphery of said rings 15 and 16. Each ring 15 and 16 is sealed with respect to retainers 14 and 18, respectively, by a flexible resilient secondary sealing member shown here in the form of an O-ring 23, 24, respectively, compressed between an inner surface on each ring and an inner cylindrical wall 25 and 26, respectively, of retainers 14 and 18.

Central rotating mating ring 17 is preferably a rigid solid ring fitting loosely over shaft 10 and clamped in place axially on the shaft between sleeves 27 and 28 fixed in any suitable manner to shaft 10. Said central rotating mating ring is formed with parallel flat surfaces 29 and 30. Inboard primary sealing ring 15 has a flat surface 31 in sealing contact with surface 29, and outboard primary sealing ring 16 has a flat surface 32 in sealing contact with surface 30. Springs 33 and 34, compressed between a retainer wall and each ring 15 and 16, respectively, serve to hold the rings, at least initially, in contact with central rotating mating ring 17. The latter is resiliently sealed with respect to shaft 10, the seal taking the form of an O-ring 35 of rubber or like material between shaft 10 and the bottom of an internal groove 36 formed in mating ring 17.

It may be observed that the sealing faces 31 and 32 on rings 15 and 16 are so disposed radially with reference to the outer diameters of their respective O-rings 23 and 24 that some of the fluid pressure acting upon the ring is used to hold the sealing face of that ring, in contact with rotating mating ring 17 and thus assist in balancing any fluid pressure developed between the contacting primary ring and mating ring sealing surfaces. The product being sealed is contained to the left (FIG. 1) of retainer 14 and hence is on the inside of inboard primary sealing ring 15. The atmosphere is present to the right of retainer 14 and hence is on the inside of outboard primary sealing ring 16. The space in retainer 14 between rings 15 and 16 is drained back to the sump (not shown) of the housing 12 through one or more openings 37 in outer cylindrical wall 20 of retainer 14 and then through a collector groove 38 and drain opening 39 in housing 12 leading to said sump.

To prevent any leakage to atmosphere of the liquid being sealed, that is, through both inboard and outboard seals to atmosphere, it is necessary to establish a decreasing pressure differential from the atmospheric side of the outboard seal to the drain. This is accomplished, in the seal illustrated, as follows:

Sealing face 31 of inboard primary ring 15 is formed with a concentric groove 40 which is in fluid communication with the ends of a series of holes 41 drilled through rotating mating ring 17 at an angle to the axis of rotation of said ring 17 to place the outer ends of the openings at a greater distance from the axis of said mating ring 17 than the inner ends. At the outer ends, and preferably extending around said outer ends, the surface 30 of the mating ring 17 is relieved (FIG. 2) or recessed as at 42 to the exterior surface of rotating mating ring 17.

Thus groove 40 collects any fluid that may leak across surface 31 from the product side of that surface. Holes 41, being angularly disposed to the axis of rotation with their outer ends farther from the axis than their inner ends, serve as centrifugal pumps to remove the leaked fluid from groove 40. Relieved areas 42 around the exit ends of holes 41 serve as additional pumps to move the leakage radially out to the drain area in retainer 14 and thence, through opening 37, collector groove 38 and drain opening 39, to the sump of housing 12. In addition, relieved areas 42 serve as hydropads to surface 32 of outboard primary ring 16 to assist in lubricating this surface. The hydropad action also causes surface 32 to be separated slightly from surface 30 on rotating mating ring 17, thereby preventing undue wear on that portion of surface 32 which is located radially inward of the hydropads and hence likely to be dry due to the pressure drop created across surface 32 by the radially outward pumping action of the hydropads.

The double seal design described above is assembled, handled and installed as a unit, with mating ring 17 confined in retainer 14 between primary sealing rings 15 and 16. It is pressed into bore 11 and held in place against the pressure of the fluid being sealed by a snap ring 43.

I claim:

1. A rotary mechanical seal for preventing leakage of fluid under pressure along a shaft or the like, said seal comprising a rigid rotating mating ring having substantially parallel flat sealing surfaces on opposite sides thereof, inboard and outboard primary sealing rings each having a sealing surface in contact with one of the rotating mating ring sealing surfaces, a housing having a bore in which said rotating mating ring and inboard and outboard primary sealing rings are disposed, means fixing said inboard and outboard primary sealing rings against rotation relative to the housing, means sealing said primary sealing rings flexibly to said fixing means, resilient means holding said inboard and outboard primary sealing rings against the flat sealing surfaces of the rotating mating ring, said inboard primary ring sealing surface having a groove therein to collect leakage of fluid across said inboard primary ring sealing surface, said rotating mating ring having a plurality of holes disposed with their axes radially inclined with respect to the axis of said mating ring, the radially inner ends of said holes being in communication with the groove in the inboard primary ring sealing surface, and the radially outer ends of said holes being in communication with the sealing surface on the outboard primary ring, means on the rotating mating ring for inducing radially outward movement of the fluid in the radially outer ends of the rotating mating ring, and means for conducting fluid from around the rotating mating ring to a sump.

2. A rotary mechanical seal as defined in claim 1, said means for inducing radially outward movement of the fluid comprising recesses in the rotating mating ring sealing surface surrounding the radially outer ends of the holes and communicating with the exterior of the rotating mating ring, said recesses producing a radially outward pumping action in the leakage fluid and a sub-atmospheric pressure in the radially inner end of the outboard primary ring sealing surface.

3. A rotary mechanical seal as defined in claim 2, said recesses extending radially outward to the exterior of the mating ring to force leakage fluid between the sealing surfaces of the rotating mating ring and outboard primary sealing ring whereby to lubricate said surface in a zone including said recesses and separating said surfaces to avoid contact between said surfaces in zones not lubricated by the leakage fluid.

4. A rotary mechanical seal as defined in claim 1, said means fixing said inboard and outboard primary sealing rings to the housing comprising a retainer frictionally held within the bore and sealed thereto, lugs on the retainer extending into recesses in the inboard sealing ring, a second retainer frictionally held in the first retainer and sealed thereto, said outboard primary sealing ring being disposed in said second retainer, and lugs in the second retainer extending into recesses in the outboard primary sealing ring.

* * * * *